United States Patent

[11] 3,621,957

| [72] | Inventor | Laurence L. Howe<br>5338 North 22nd Drive, Phoenix, Ariz. 85015 |
|---|---|---|
| [21] | Appl. No. | 872,807 |
| [22] | Filed | Oct. 31, 1969 |
| [45] | Patented | Nov. 23, 1971 |

[54] AUTOMATIC SAFETY BRAKE FOR AUTOMOTIVE VEHICLES
2 Claims, 5 Drawing Figs.

| [52] | U.S. Cl. | 192/3 R, 192/4 A, 74/710.5 |
|---|---|---|
| [51] | Int. Cl. | F16h 57/10 |
| [50] | Field of Search | 192/4 A, 3; 74/710.5 |

[56] References Cited
UNITED STATES PATENTS

| 1,729,015 | 9/1929 | Seidman | 192/3 |
|---|---|---|---|
| 1,843,966 | 2/1932 | Adams | 192/3 |
| 3,000,476 | 9/1961 | Barry | 192/3 |
| 3,439,786 | 4/1969 | Schmid | 192/4 A |
| 3,517,572 | 6/1970 | Schmid | 192/4 A X |

Primary Examiner—Benjamin W. Wyche

ABSTRACT: This invention consists of a brake drum that is riveted or otherwise secured to the case in the differential of an automotive vehicle. The brake drum is encompassed by a brake shoe that is provided with a lining which acts on the aforesaid brake drum when the shoe is tightened by a spring-loaded bolt. When the key of the ignition switch of the vehicle is turned off, the electric current from the ignition switch holds an elliptical cam open by means of a solenoid.

INVENTOR
LAURENCE L. HOWE

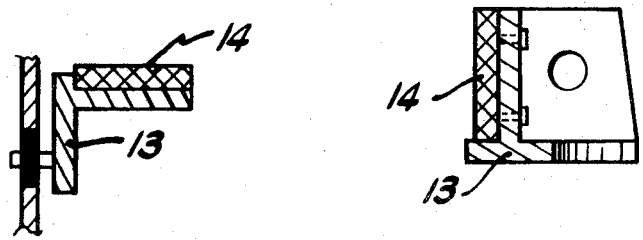
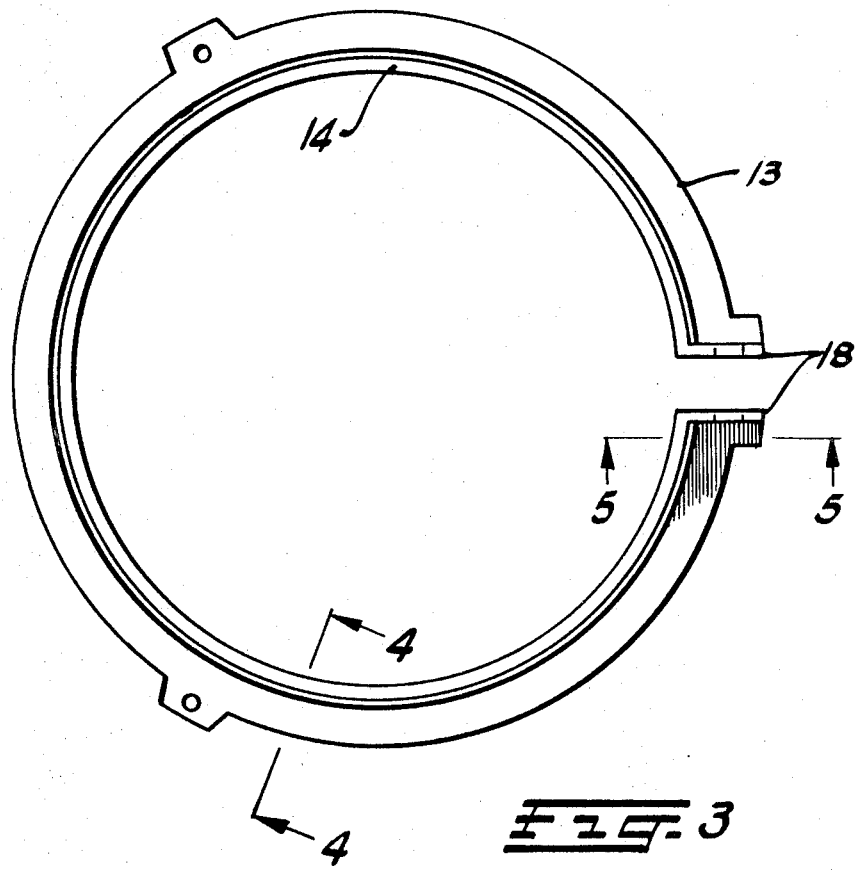

AUTOMATIC SAFETY BRAKE FOR AUTOMOTIVE VEHICLES

This invention relates to automotive vehicles; more particularly, to a safety device in the form of an automatic brake that is adapted to the differential of the vehicle; still more particularly, to a brake that will automatically become activated whenever the ignition key is turned in an off position.

It is the principal object of this invention to provide an automatic safety brake for automotive vehicles that will act upon the ring gear of the differential of the vehicle and which will become activated when the ignition switch key of the car is in the off position.

Another object of this invention is to provide an automatic safety brake for automotive vehicles that will prevent the vehicle from being moved when the key of the car has been removed, thereby preventing the vehicle from being used by an unauthorized person.

Another object of this invention is to provide an automatic safety brake for automotive vehicles, the brake embodying only one brake band and a minimum number of parts, thus reducing its maintenance to a minimum.

Another object of this invention is to provide an automatic safety brake for automotive vehicles that cannot be released, once it has been set, without the use of the ignition key of the vehicle.

Still another object of this invention is to provide an automatic safety brake for automotive vehicles that must be incorporated in the vehicle at the time of its manufacture, thus preventing possible improper installation by those less experienced in the automotive vehicle assembly art because of their limited knowledge and/or their lack of proper tools.

Other objects and advantages of this invention will hereinafter appear as the reading of this specification and its appended claims proceeds and the accompanying drawings are examined in connection therewith.

In the drawings:

FIG. 1 is a sectional view of a typical differential of an automotive vehicle, taken substantially along line 1—1 of FIG. 2, and viewed in the direction indicated by the arrows in FIG. 2 showing this invention. Only the invention itself is shown in solid black lines.

FIG. 2 is a sectional view of a typical differential of an automotive vehicle looking inward from one of the rear wheels. Only the invention is shown in solid black lines. The drive shaft has been omitted for reasons of clarity.

FIG. 3 is a side view of the brake band portion of this invention.

FIG. 4 is a sectional view of a portion of this invention, taken substantially along line 4—4 of FIG. 3, and viewed in the direction indicated by the arrows.

FIG. 5 is a sectional view of a portion of this invention, taken substantially along line 5—5 of FIG. 3, and viewed in the direction indicated by the arrows.

In the several views of the drawings, like parts of this invention are indicated by like reference numbers.

Figure 1:
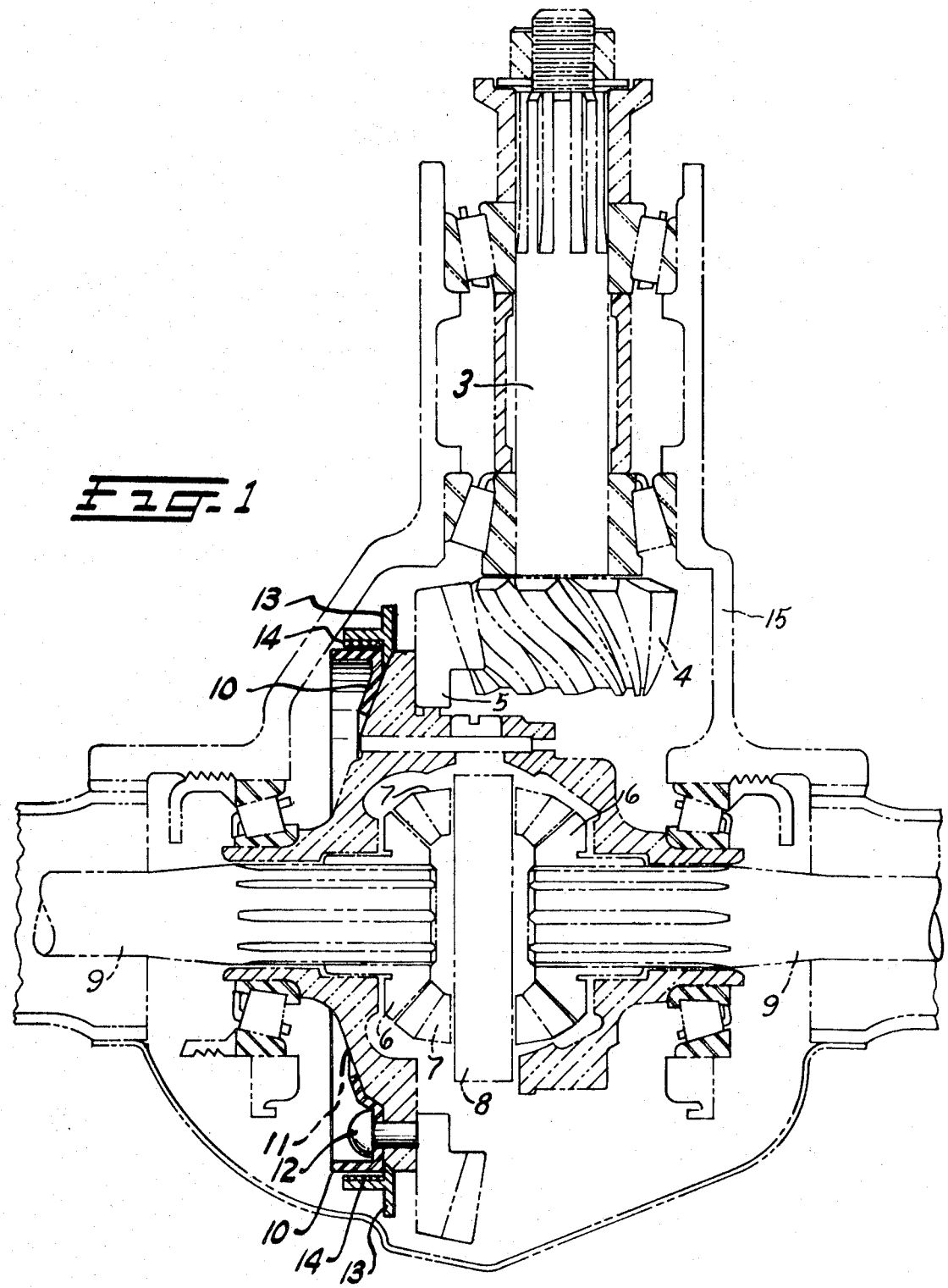
Figure 2:
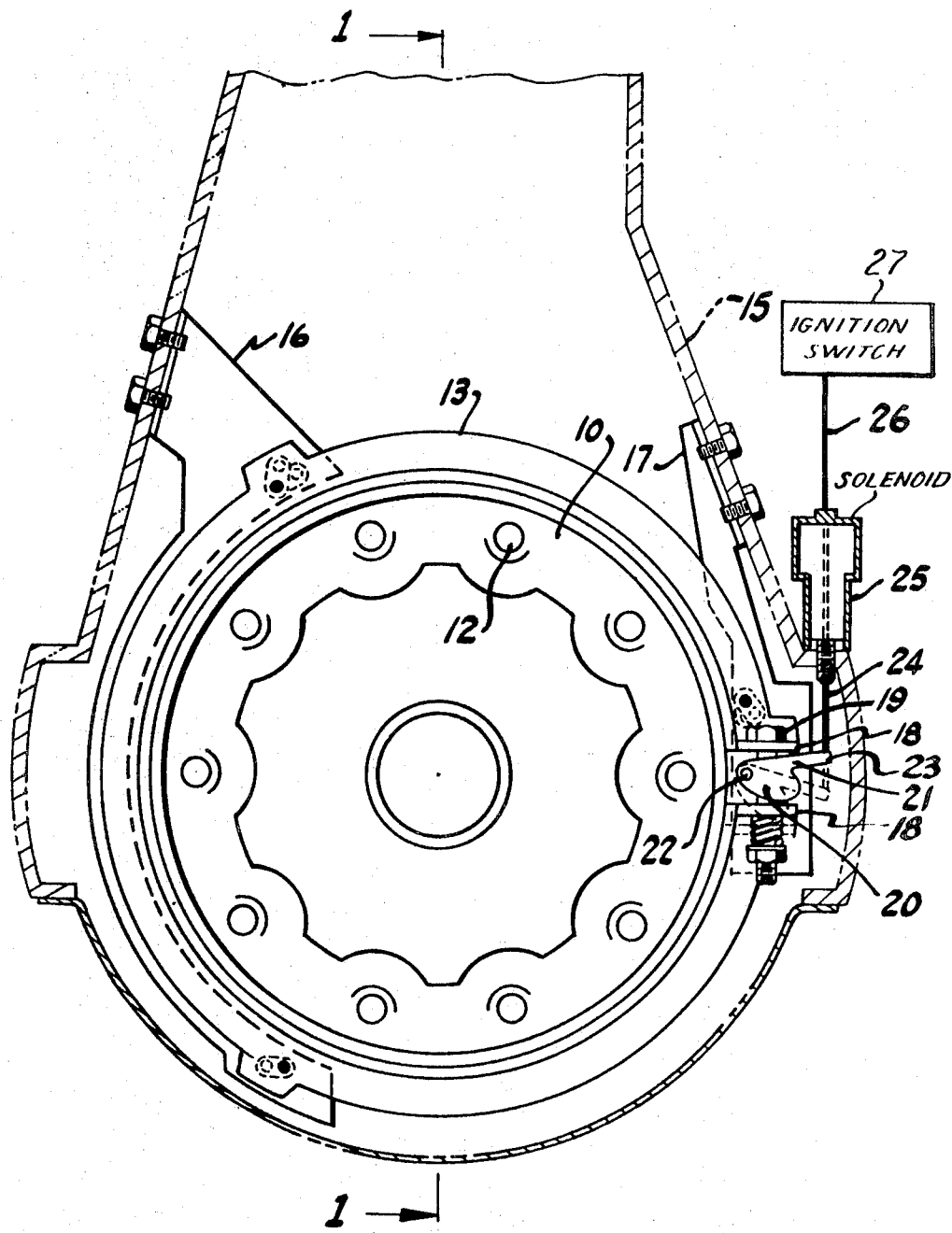

Directing ones attention to FIGS. 1 and 2 of the accompanying drawings it will be seen that while the invention is only a small part of these two illustrations, the major parts of the differential of a vehicle must be shown for those of limited experience in the automotive vehicle art so that they might understand this safety brake. Only the safety brake is shown in solid black lines, the differential itself being shown in phantom lines for reasons of clarity.

This invention consists of a brake drum 10 that is secured to the differential case 11 by means of a plurality of equally and radially spaced rivets 12. A brake shoe 13, having a lining 14 on the underside thereof, encompasses the aforesaid brake drum 10 in the usual manner known to those experienced in the art. The aforesaid brake shoe 13 is suitable secured to the inside of the differential housing 15 by means of two space braces 16 and 17, as is clearly shown in FIG. 2 of the appended drawings. It will also be seen by examining FIG. 2 that the two ends 18 of the brake shoe 13 are secured loosely together in parallel spaced relation to each other by means of the spring-loaded bolt 19. An elliptical cam 20, having an arm 21 extending outward therefrom, is swingably secured to the aforesaid brace 17 by means of the pin 22. The outer end 23 of the aforesaid arm 21 is in turn swingably secured to the lower end of the link 24 that projects downward from, and is a part of, the solenoid 25. The solenoid is connected by the wire 26 to the ignition switch 27 of the vehicle. The aforesaid ignition switch is not shown in any of the views of the accompanying drawings since the switch is located on a part of the vehicle that is some distance away from and not connected to the aforesaid differential of the vehicle.

The conventional parts of a vehicle which are shown in phantom lines in FIGS. 1 and 2 of the drawings include a drive shaft 3, a drive shaft pinion 4, a ring gear 5, side gears 6, pinion gears 7, a pinion gear shaft 8, axles 9, a differential housing 15, a differential case 11, and keys and bearings. Through these parts the drive shaft drives the rear axles and does not interfere with turning of the vehicle. This is accomplished in a manner which is well known to those skilled in the art.

It will be realized from reading the above description of the construction of this invention that the mechanism must be assembled to the differential of the vehicle when the vehicle is manufactured and cannot be put on after the car is made. The way in which this novel automatic safety brake works is quite simple. When the ignition switch is turned on with the key, electric current from the ignition system will energize the aforesaid solenoid 25 which will pull its lever 24 that is connected to the aforesaid brake shoe 13 to a disengaging position. The moment the ignition switch of the vehicle is turned off, the aforesaid spring-loaded bolt 18 will draw the two ends of the often mentioned brake shoe together and thus put on the brake which will slow down and hold the rear wheels of the vehicle by means of the mechanism of the differential, as will be realized by those having knowledge of the design and construction of automotive vehicles.

What I now claim as new and desire to secure by Letters Patent is:

1. The combination of: an automotive vehicle having a differential case, a differential housing, and an ignition switch, and an automatic safety brake; comprising a brake drum secured to the differential case, a brake shoe encompassing the brake drum, means securing the brake shoe to the differential housing, the brake shoe having spaced and parallel ends, a spring-loaded bolt passing through openings in said ends to tend to bring said brake shoe into contact with said brake drum, an elliptical cam swingably mounted between the said ends of the said brake shoe to provide a means of holding the said brake shoe in a position away from said brake drum, an arm extending from said elliptical cam, electrically activated mechanism connected to the outer end of said arm and connected by a wire to said ignition switch, whereby said mechanism will remove said cam to move the brake shoe away from the brake drum when the ignition switch is turned on.

2. The invention of claim 1, wherein the last mentioned mechanism is a solenoid that is held open by electric current coming through the said wire from the said ignition switch, the said solenoid having a link that has its outer end connected to the outer end of the said arm of the said elliptical cam.

* * * * *